(12) United States Patent
Guernsey

(10) Patent No.: US 7,980,385 B2
(45) Date of Patent: Jul. 19, 2011

(54) PLASTIC CONVEYOR BELTS AND MODULES WITH LATERAL CHANNELS

(75) Inventor: Kevin W. Guernsey, Kenner, LA (US)

(73) Assignee: Laitram, L.L.C., Harahan, LA (US)

( * ) Notice: Subject to any disclaimer, the term of this patent is extended or adjusted under 35 U.S.C. 154(b) by 997 days.

(21) Appl. No.: 11/160,224

(22) Filed: Jun. 14, 2005

(65) Prior Publication Data

US 2006/0278500 A1 Dec. 14, 2006

(51) Int. Cl.
*B65G 17/38* (2006.01)
*B65G 17/06* (2006.01)

(52) U.S. Cl. .................................... 198/850

(58) Field of Classification Search .......... 198/850, 198/851, 852, 853
See application file for complete search history.

(56) References Cited

U.S. PATENT DOCUMENTS

| | | | |
|---|---|---|---|
| 3,680,927 A | 8/1972 | Neureuter | |
| 4,213,527 A | 7/1980 | Lapeyre et al. | |
| 4,325,478 A * | 4/1982 | Richard | 198/699 |
| 4,776,454 A * | 10/1988 | Momose | 198/853 |
| 4,925,016 A | 5/1990 | Lapeyre | 198/834 |
| 5,020,656 A | 6/1991 | Faulkner | 198/494 |
| 5,161,666 A * | 11/1992 | Pope | 198/498 |
| 5,170,883 A * | 12/1992 | Ledet et al. | 198/834 |
| 5,560,468 A * | 10/1996 | Inoue | 198/333 |
| 5,586,643 A | 12/1996 | Zabron et al. | |
| 6,305,530 B1 | 10/2001 | Guldenfels | 198/853 |
| 6,412,625 B2 | 7/2002 | Damkjaer | 198/834 |
| 6,471,049 B1 * | 10/2002 | van Esch et al. | 198/853 |
| 6,523,679 B1 * | 2/2003 | Manchester | 198/841 |
| 7,097,030 B2 | 8/2006 | Gundlach | |
| 2005/0241924 A1 | 11/2005 | Damkjaer | |

OTHER PUBLICATIONS

Intralox, LLC., "Conveyor Belting Engineering Manual," 2004, title page and pp. 69, 147, 155, Intralox, LLC., Harahan, LA, USA.
Ashworth Bros., Inc., "Product Technical Bulletin AP200 Series," Mar. 13, 2001, pp. 1-4, Ashworth Bros. Inc., Winchester, VA, USA.
Siegling GmbH, "ProLink Product Range Plastic Modular Belting," date unknown, 5 pages, Siegling GmbH, Hannover, Germany.
Falcon Belting, Inc., "The 84Series Belts for Meat and Poultry MP84 &84T," date unknown, 2 pages, Falcon Belting, Inc., Oklahoma City, OK, USA.
European Patent Office as International Searching Authority, "International Search Report of PCT/US06/2212," mailing date Nov. 8, 2006, European Patent Office, Rijswijk, the Netherlands.

* cited by examiner

*Primary Examiner* — Gene Crawford
*Assistant Examiner* — Ramya Prakasam
(74) *Attorney, Agent, or Firm* — James T. Cronvich

(57) ABSTRACT

An easy-to-clean conveyor belt constructed of a series of rows of belt modules having lateral depressions forming channels across the width of the belt along which water can be sprayed to flush debris off the side edge of the belt. Lateral ridges between the depressions and hinge eyes at the ends of each module serve as levees that prevent debris being flushed through the channels from draining into hinge joints between consecutive belt rows.

13 Claims, 2 Drawing Sheets

PLASTIC CONVEYOR BELTS AND MODULES WITH LATERAL CHANNELS

BACKGROUND

The invention relates to power-driven conveyors and, more particularly, to modular plastic conveyor belts having lateral channels formed in an underside to guide cleaning liquids and debris to the edges of the belt.

Modular plastic conveyor belts are widely used in the meat and poultry industries to convey raw meat through processing stations. The belts are constructed of a series of rows of side-by-side belt modules. Hinge eyes along opposite ends of each row interleave with hinge eyes of consecutive rows. A hinge rod inserted in the interleaved hinge eyes connects the rows together at hinge joints into an endless conveyor belt loop.

To meet USDA sanitation requirements, the modular plastic conveyor belts must be cleanable. The hinge joints and drive structure on the interior side of the belt loop are particularly susceptible to the accumulation of fats, dirt, and debris. Water sprays are commonly positioned to direct water and cleaning fluids toward the underside of the belt—often as it opens while articulating about a drive or idler sprocket. But as the belt makes its return on a lower returnway, debris can drain back into the hinge joints because the interior side faces upward. This is especially true on belts having a generally continuous structure with little open area.

Thus, there is a need for an easy-to-clean modular plastic conveyor belt.

SUMMARY

This need and other needs are satisfied by a modular plastic conveyor belt and modules embodying features of the invention. In one aspect, a conveyor belt module comprises a module body that extends longitudinally from a first end to a second end, laterally from a first edge to a second edge, and in thickness from a conveying surface to an opposite surface. Hinge structure extends longitudinally outward from the first and second ends of the module body. The surface opposite the conveying surface is contoured with two lateral depressions that form channels extending from the first edge to the second edge of the module body between the first and second ends. When connected edge to edge and end to end with other such modules into a conveyor belt, the modules form elongated channels laterally across each row to guide liquids and debris laterally across each row.

In another aspect of the invention, a conveyor belt module comprises a module body that extends longitudinally from a first end to a second end, laterally from a first edge to a second edge, and in thickness from a first side to a second side. Hinge structure extends longitudinally outward from the first and second ends of the module body. A bar disposed laterally from the first edge to the second edge between the first and second ends and extending outward from the second side divides the second side into first and second portions. Each of the first and second portions forms a depression in the second side that extends laterally from the first edge to the second edge of the module body.

According to yet another aspect of the invention, a conveyor belt module comprises a module body that extends in a longitudinal direction from a first end to a second end, in a lateral direction from a first edge to a second edge, and in thickness from a conveying surface to a contoured surface. The profile of the contoured surface is defined as the distance between the contoured surface and a plane disposed parallel to the longitudinal and lateral directions between the conveying surface and the contoured surface. Hinge structure extends in the longitudinal direction outward from the first and second ends of the module body. The profile of the contoured surface at any lateral position along a longitudinal path is defined by a function having a first relative maximum midway between the first and second ends, second and third relative maxima between the first relative maximum and the first and second ends, and first and second relative minima between the first relative maximum and the second and third relative maxima.

In another aspect of the invention, a conveyor belt module comprises a module body that extends longitudinally from a first end to a second end, laterally from a first edge to a second edge, and in thickness from a first side to a second side. Hinge structure extends longitudinally outward from the first and second ends of the module body. A first ridge proximate the hinge structure extends outward from the second side of the module body and is disposed laterally from the first edge to the second edge along the first end. A second ridge extends outward from the second side of the module body and is disposed laterally from the first edge to the second edge along the second end. The module body forms at least one depression that extends laterally along the second side from the first edge to the second edge between the first and second ridges.

BRIEF DESCRIPTION OF THE DRAWINGS

These features and aspects of the invention, as well as its advantages, are better understood by reference to the following description, appended claims, and accompanying drawings, in which:

DETAILED DESCRIPTION

Figure 1:
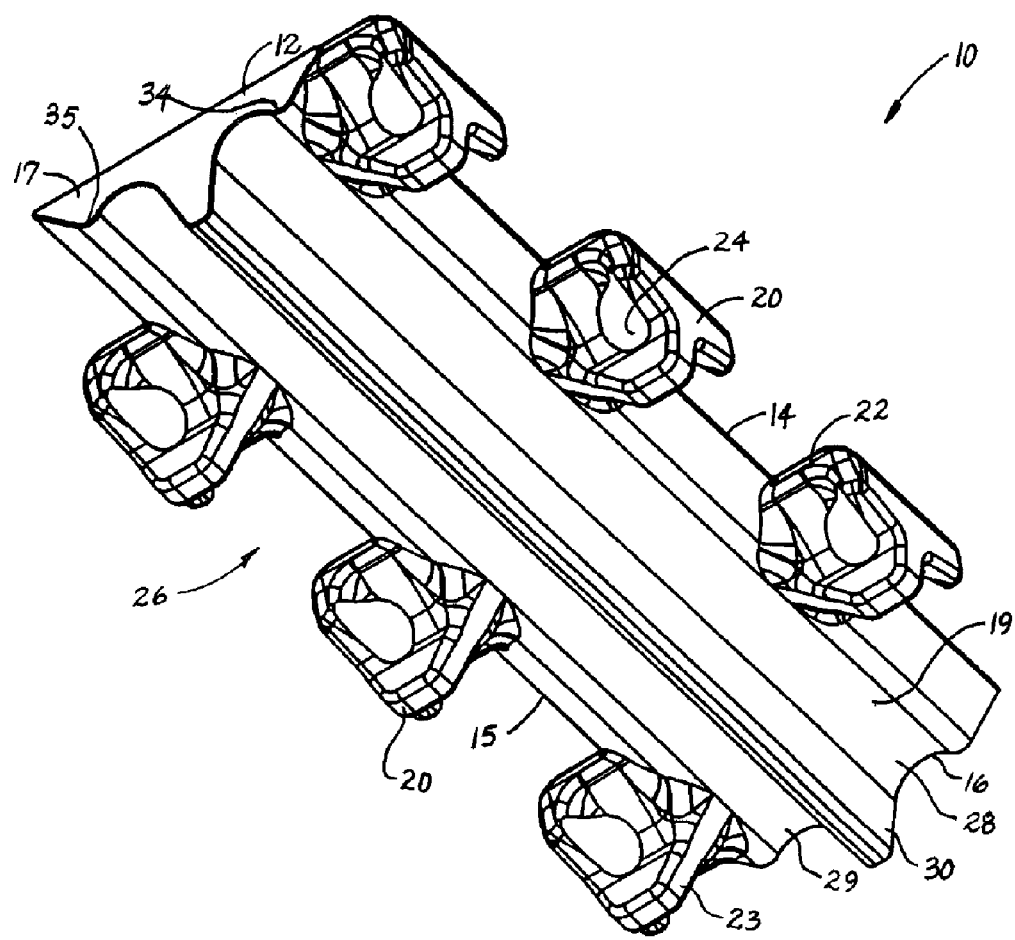
FIG. 1 is an isometric view of a conveyor belt module embodying features of the invention.
Figure 2:
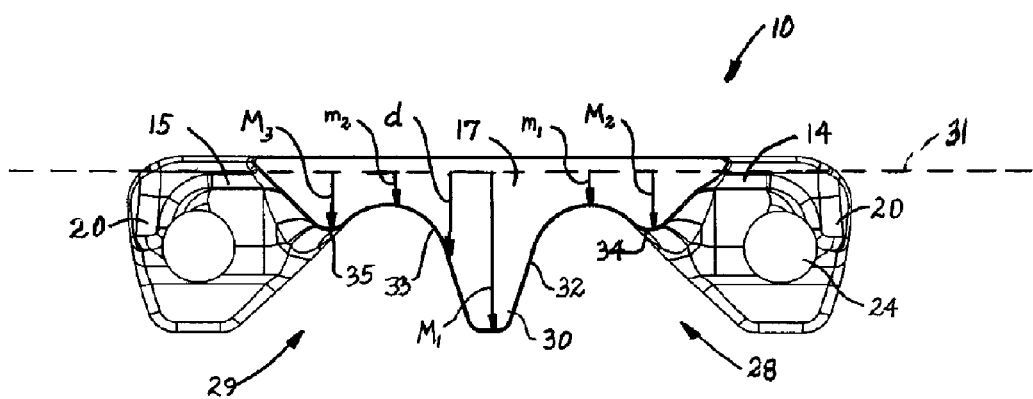
FIG. 2 is a side elevation view of the module of FIG. 1.

A plastic conveyor belt module 10 embodying features of the invention is shown in FIGS. 1 and 2. The module's body 12 extends longitudinally from a first end 14 to a second end 15. The longitudinal direction is the direction of belt travel when such a module is built into a modular conveyor belt. The module body extends laterally from a first edge 16 to a second edge 17. In thickness, the module body extends from a conveying surface 18, on which conveyed articles are carried, to an opposite surface 19. Hinge structure, shown as eyes 20, extends longitudinally outward from the first and second ends of the module body. The hinge eyes are wide in an outer portion 22 to form a continuation of the conveying surface. The hinge eyes taper to a narrow portion 23 at the opposite surface. This allows a hinge rod received in openings 24 to be accessed for inspection or cleaning. The hinge eyes on one end of the module body are laterally offset from the hinge eyes at the other end. Gaps 26 between laterally consecutive hinge eyes are sized to receive the hinge eyes of similar modules in an adjacent row of modules in a conveyor belt.

The surface 19 of the module body opposite the conveying surface is contoured. Two lateral depressions 28, 29 formed in the contoured surface extend from one edge of the module body to the other. The ends of the depressions are open, unoccluded by structure at the edges of the module body. The depressions are preferably arcuate, or curved, in cross section to avoid sharp corners in which debris can become trapped. A ridge in the form of a bar 30 between the depressions separates the contoured surface into first and second portions 32, 33. The bar may be a drive bar for receiving a driving force from a sprocket or drive drum or may serve to add beam strength or impact resistance to the module. Lateral ridges 34, 35 bounding the depressions at the first and second ends of the module body near the hinge eyes are formed on the contoured surface. These ridges act as levees to prevent water, fluids, and debris guided along lateral channels formed by the depressions from flowing into the hinge eyes. The ridges at the first and second ends are preferably not as tall as the central ridge 30.

The contoured surface 19 may be described in a mathematical sense. If the profile of the contoured surface is defined as the distance d between the contoured surface and a plane 31 that is parallel to the longitudinal and lateral directions and that lies between the conveying surface and the contoured surface, then, at any lateral position, d(x) is a mathematical function that varies in the longitudinal direction x. The function has a first relative maximum $M_1$ midway between first and second ends of the module body and second and third relative maxima $M_2$, $M_3$ between the first relative maximum and the first and second ends. The profile function d(x) also has first and second relative minima $m_1$, $m_2$ between the relative maxima. Preferably, the second and third relative maxima $M_2$, $M_3$ are equal in magnitude and the relative minima $m_1$, $m_2$ are equal in magnitude to form symmetrical channels on each side of the central bar 30. The first relative maximum $M_1$, representing the central bar is preferably greater than the second and third relative maxima $M_2$, $M_3$ in magnitude. Thus, in a preferred version, the central ridge or bar 30 is taller than the flanking ridges 34, 35.

The modules are preferably made of thermoplastic polymers, such as polypropylene, polyethylene, acetal, or composite polymers in an injection-molding process. Plastic conveyor belt modules made in this way are available commercially from Intralox, L.L.C., of Harahan, La., USA.

Figure 3:
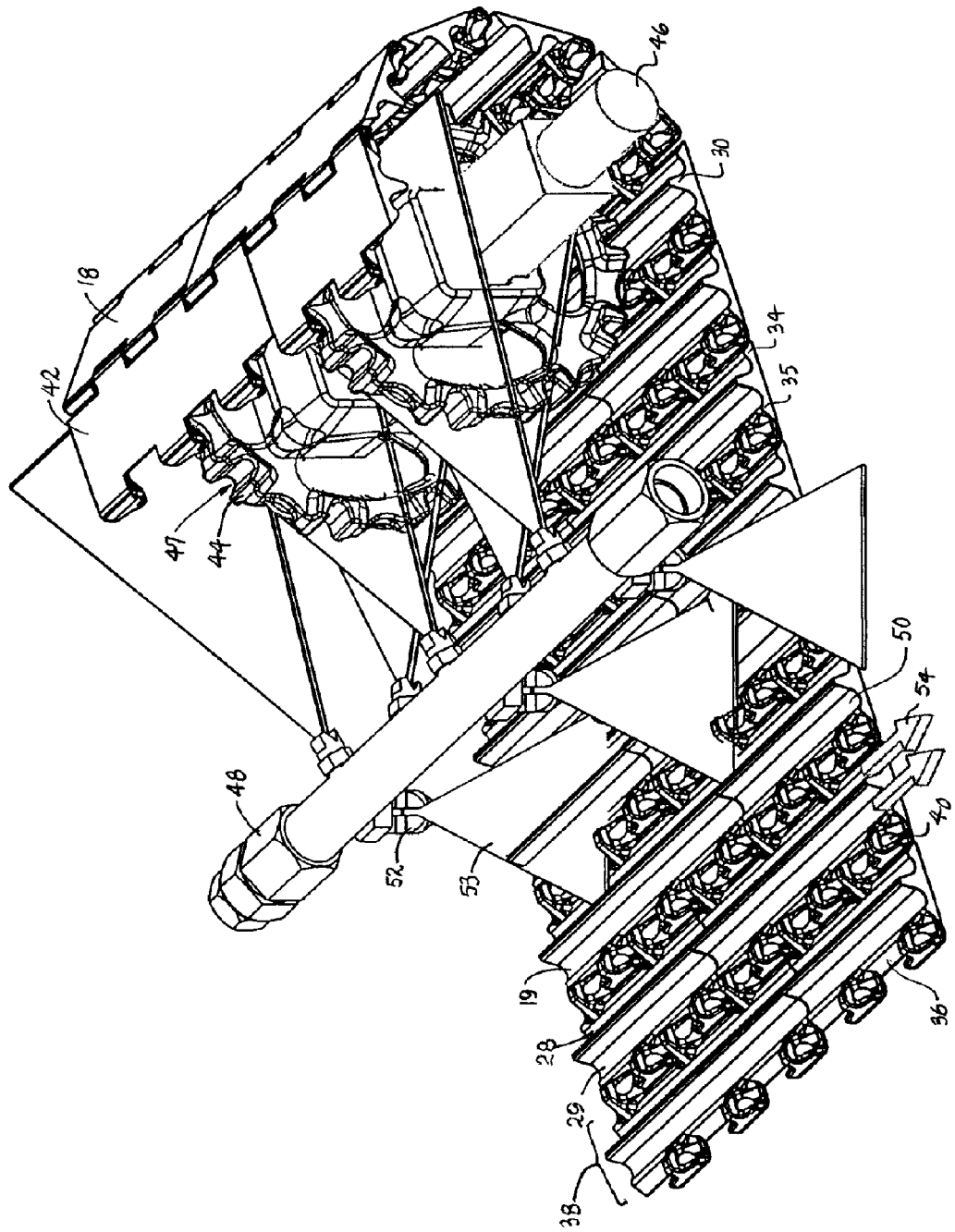
FIG. 3 is a partial isometric view of a conveyor using a belt constructed of modules as in FIG. 1.

The benefits of constructing a conveyor belt using the modules shown in FIGS. 1 and 2 are shown in FIG. 3. The belt 36 is constructed of a series of rows 38 of edge-to-edge belt modules. Modules of different lateral widths are used to construct the belt in a bricklay pattern. But wide modules extending the entire width of the belt could alternatively be used. The rows are interconnected by hinge rods 40 extending laterally through the passageways formed by the aligned openings in the interleaved hinge eyes between adjacent rows. The belt conveys articles atop the conveying surfaces 18 of the modules along an upper carryway portion 42 of the conveyor. The belt is driven by drive sprockets 44 mounted on a drive shaft 46 at an end of the carryway portion. Recesses 47 in the periphery of the sprocket engage the lateral bars 30 of the belt modules to drive the belt. The belt is cleaned by a portable or permanent cleaning system 48 that directs water or cleaning fluid into the contoured interior side of the belt, preferably near the sprockets. The belt articulates about the sprockets in its transition from the carryway portion of its path to a returnway portion 50. In the returnway, the contoured surface 19 of the belt is generally facing upward. One or more spray nozzles 52 direct water 53 laterally across the contoured surface to flush debris from the interior side of the belt. The depressions 28, 29 in each module are aligned with the depressions of the other modules in each belt row to form continuous channels across the width of the belt. The channels empty through open ends, unoccluded by structure at the side edges of the belt. Debris is flushed over the side edges of the belt as indicated by arrows 54. The raised ridges 34, 35 and the central bar confine the flow in the channels and prevent debris from entering the hinge joints between rows.

Although the invention has been described with respect to a preferred version, other versions are possible. For example, belt modules need not have a central drive bar as in the exemplary version described. As another example, one or more than two lateral channels could be formed in the contoured surface of the modules. So, as these few examples suggest, the scope of the claims is not meant to be limited to the preferred version described in detail.

What is claimed is:

1. A conveyor belt module for building a modular conveyor belt capable of being driven in a direction of belt travel, the module comprising:
    a module body extending longitudinally in the direction of belt travel from a first end to a second end, laterally from a first edge to a second edge, and in thickness from a conveying surface to an opposite surface;
    hinge structure in the form of laterally spaced apart projections extending longitudinally outward from the first and second ends of the module body;
    wherein the opposite surface is contoured with two lateral depressions forming channels extending laterally from the first edge to the second edge of the module body between the first and second ends;
    a ridge disposed laterally from the first edge to the second edge between the two lateral depressions and forming the tallest structure extending outward of the opposite surface between the first and second ends.

2. A conveyor belt module as in claim 1 further comprising second and third lateral ridges extending outward of the opposite surface and bounding the lateral depressions proximate the hinge structure at the first and second ends.

3. A conveyor belt module as in claim 1 wherein the depressions are arcuate in profile.

4. A modular conveyor belt comprising a plurality of conveyor belt modules as in claim 1 connected edge to edge into a row and end to end into a succession of rows of conveyor belt modules wherein the channels of edge-to-edge modules forming each row are aligned to form elongated channels laterally across each row, wherein the channels can guide liquids and debris laterally across each row.

5. A conveyor belt module for building a modular conveyor belt capable of being driven in a direction of belt travel, the module comprising:
    a module body extending longitudinally in the direction of belt travel from a first end to a second end, laterally from a first edge to a second edge, and in thickness from a first conveying side to an opposite second side;
    hinge structure in the form of laterally spaced apart projections extending longitudinally outward from the first and second ends of the module body;
    a bar disposed laterally from the first edge to the second edge between the first and second ends and extending outward from the second side to form the tallest projection from the second side between the first and second ends and to divide the second side into first and second portions;
    wherein each of the first and second portions forms a depression in the second side extending laterally from the first edge to the second edge of the module body.

6. A conveyor belt module as in claim 5 wherein the depression in each portion is arcuate in profile.

7. A modular conveyor belt comprising a plurality of conveyor belt modules as in claim 5 connected edge to edge into a row and end to end into a succession of rows of conveyor belt modules wherein the depressions in edge-to-edge modules forming each row are aligned to form elongated channels laterally across each row, wherein the channels can guide liquids and debris laterally across each row.

8. A conveyor belt module for building a modular conveyor belt capable of being driven in a direction of belt travel, the module comprising:
- a module body extending in a longitudinal direction of belt travel from a first end to a second end, in a lateral direction from a first edge to a second edge, and in thickness from a conveying surface to a contoured surface, wherein the profile of the contoured surface is defined as the distance between the contoured surface and a plane disposed parallel to the longitudinal and lateral directions between the conveying surface and the contoured surface;
- hinge structure in the form of laterally spaced apart projections extending in the longitudinal direction outward from the first and second ends of the module body;
- wherein the profile of the contoured surface at any lateral position along a longitudinal path is defined by a function having a first relative maximum midway between the first and second ends, second and third relative maxima between the first relative maximum and the first and second ends, and first and second relative minima between the first relative maximum and the second and third relative maxima;
- wherein the first relative maximum is greater in magnitude than the second and third relative maxima.

9. A conveyor belt module as in claim 8 wherein the second and third relative maxima are equal in magnitude.

10. A conveyor belt module as in claim 8 wherein the first and second relative minima are equal in magnitude.

11. A conveyor belt module for building a modular conveyor belt capable of being driven in a direction of belt travel, the module comprising:
- a module body extending longitudinally in the direction of belt travel from a first end to a second end, laterally from a first edge to a second edge, and in thickness from a first conveying side to an opposite second side;
- hinge structure in the form of laterally spaced apart projections extending longitudinally outward from the first and second ends of the module body;
- a first ridge extending outward from the second side of the module body and disposed laterally from the first edge to the second edge along the first end proximate the hinge structure;
- a second ridge extending outward from the second side of the module body and disposed laterally from the first edge to the second edge along the second end;
- a third ridge, taller than the first and second ridges, disposed laterally along the second side from the first edge to the second edge between the first and second ridges;
- wherein the module body forms a first depression extending laterally along the second side from the first edge to the second edge between the first and third ridges and a second depression extending laterally along the second side from the first edge to the second edge between the second and third ridges.

12. A conveyor belt module as in claim 11 wherein the first and second depressions are arcuate in profile.

13. A modular conveyor belt comprising a plurality of conveyor belt modules as in claim 11 connected edge to edge into a row and end to end into a succession of rows of conveyor belt modules wherein the first and second ridges and the depressions in edge-to-edge modules forming each row are aligned to form elongated channels laterally across each row, wherein the first and second ridges block liquids and debris from entering the hinge structure.

\* \* \* \* \*